United States Patent
Lowder et al.

[11] 3,936,203
[45] Feb. 3, 1976

[54] PIN RETENTION DEVICE

[75] Inventors: James E. Lowder; Gary D. Perry, both of Lubbock, Tex.

[73] Assignee: Eagle-Picher Industries, Inc., Cincinnati, Ohio

[22] Filed: Aug. 6, 1974

[21] Appl. No.: 495,215

[52] U.S. Cl. .................... 403/154; 403/316
[51] Int. Cl.² .............................. F16B 21/00
[58] Field of Search ........... 403/315, 316, 317, 319, 403/154, 155, 157, 79; 299/92; 85/5 N, 5 CP, 8.3, 7, 8.1; 151/61, 62, 63; 280/515; 37/142 A; 287/DIG. 7

[56] References Cited
UNITED STATES PATENTS

| | | | |
|---|---|---|---|
| 451,174 | 4/1891 | Schofield | 151/62 |
| 709,043 | 9/1902 | Roberts, Sr. | 151/62 |
| 1,044,292 | 11/1912 | Terhune | 151/61 UX |
| 1,121,865 | 12/1914 | Pitt | 85/8.1 UX |
| 2,279,960 | 4/1942 | Terry | 85/7 X |
| 2,512,690 | 6/1950 | Smith | 287/DIG. 7 UX |
| 3,126,654 | 3/1964 | Eyolfson et al. | 85/8.3 X |

Primary Examiner—Andrew V. Kundrat
Attorney, Agent, or Firm—Cushman, Darby and Cushman

[57] ABSTRACT

A pivot pin or the like is retained in an aperture in a supporting structure by a removable locking element inserted by movement transverse to the axis of the pin into a position lying between one end of the pin and a fixed flange-like retaining element which is secured to the supporting structure adjacent the aperture. In the illustrated embodiments the end of the pin is partially cut away so as to form a notch for receiving the locking element.

3 Claims, 7 Drawing Figures

PIN RETENTION DEVICE

BACKGROUND OF THE INVENTION

1. Field of the Invention

This invention relates to a bolt or pin retention device for releasably securing a bolt or pin within an aperture in a support structure. Pin retention devices are used in a variety of environments, particularly heavy duty machinery in which pin-connected parts are subjected to high stress during use.

2. Description of the Prior Art

In U.S. Pat. No. 2,543,148 there is disclosed a shaft or pin locking mechanism wherein a bar is welded or otherwise secured to a yoke and prevents a shaft disposed within the yoke from moving outwardly therefrom. The shaft has a notched pin head which abuts against the bar and a cotter pin is placed through the head to prevent the shaft from being removed in the other direction from the yoke. Such a pin locking mechanism, while completely retaining the pin from one end thereof, is disadvantageous because the cotter pins are susceptible to breakage after a certain number of repeated uses. A cotter key when inserted through a hole in a pin must have its end portions bent around the pin in order to prevent the cotter key from sliding out.

In U.S. Pat. No. 2,862,314 there is disclosed a drag hitch assembly in which a shackle pin is secured within a hitch plate by means of an upwardly extending arcuate wall which is disposed over a retainer plate. The retainer plate is secured to a hitch by means of a bolt. The shackle is equipped with an enlarged head which bears downwardly against the bottom wall of a recess provided in the uppermost portion of the hitch. U.S. Pat. No. 2,862,314 does not disclose or suggest a pin having a head with a notch wherein a drive lock plate is inserted between the pin and a retaining means to retain the pin completely from one end.

A lock member constructed of a molded rubber head used in conjunction with a locking pin or key is described in U.S. Pat. No. 3,126,654. The locking pin has a corrugated surface which interconnects with a plurality of metal inserts on the lock member. This particular structure is used to lock an excavating tooth onto an adapter, but there is no suggestion of using the locking pin and lock member to secure a pin having a notch into a hole. Also, there is no use of a retainer as is set forth in the present invention.

Another prior art patent of interest is U.S. Pat. No. 2,455,125. Here, there is disclosed a lock nut which has a recess provided in the nut body so that a resilient means retained in the recess will be engaged by the threads of a bolt and flexed thereby to create a frictional drag which substantially resists unloosening of the nut.

In U.S. Pat. No. 3,572,785 there is shown a wedge employed to secure an adapter and lip of a power shovel. Placed in a recess of the wedge is a pad of resilient material. A locking member which is undulated serves to connect a shovel lip and an adapter to form a connection therebetween. While one form of the present invention utilizes a locking plate with grooves which engage a plug, U.S. Pat. No. 3,572,785 does not provide for a retaining means used in conjunction with a bolt or pin having a notched head.

Spring bias is used to prevent lateral movement of a plate with respect to a bolt in U.S. Pat. No. 325,221. However, this patent does not set forth the novel structure of the present invention which uses a spring to bias a plug against a lock plate which is in turn biased against a bolt having a notched head.

SUMMARY OF THE INVENTION

It is an object of the present invention to provide a pin retention device in which a pin is retained in an aperture in a supporting structure by a removable locking element inserted by movement transverse to the axis of the pin into a position between one end of the pin and a flangelike retaining element which is secured to the supporting structure adjacent the aperture. Preferably the pin has a head which is partially cut away so as to form a notch for receiving the locking element. No retaining means is required at the other end of the pin, although such means may be provided if desired. The arrangement is compact and mechanically simple and provides for easy removal of the pin from only one end by merely forcing the locking element out of engagement with the pin and the retaining element.

A further object of the present invention is to provide for pin retention device of the above type in which small axial movements of the pin within a connection aperture are permitted in order to compensate for joint tolerances.

BRIEF DESCRIPTION OF THE DRAWINGS

Novel features of the improved pin retention device in accordance with the present invention will be more readily understood from a consideration of the following description taken together with the accompanying drawings in which certain preferred adaptations are illustrated with the various parts thereof identified by suitable reference characters in each of the views, and in which.

DETAILED DESCRIPTION OF THE INVENTION

Figure 1:
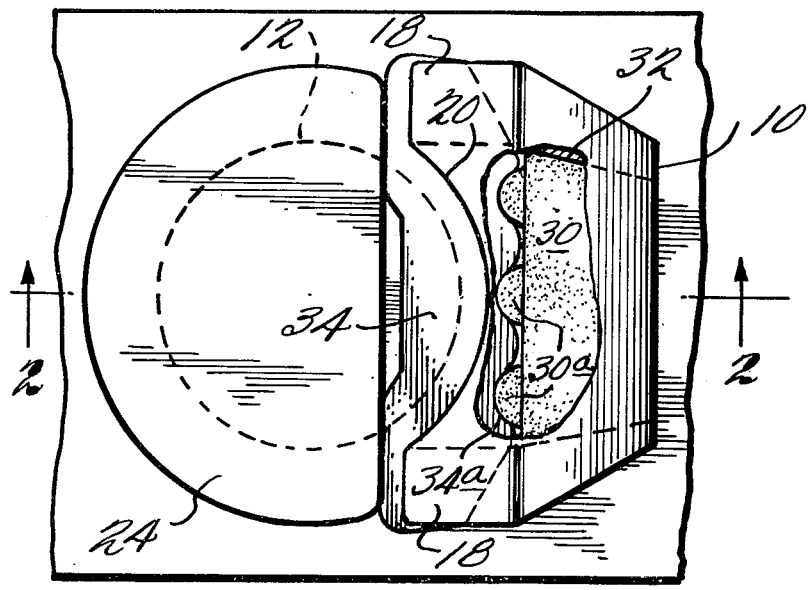
FIG. 1 illustrates a top view of a first embodiment of the present invention showing the locking plate engaging a bolt and also engaging the retaining means.
Figure 2:
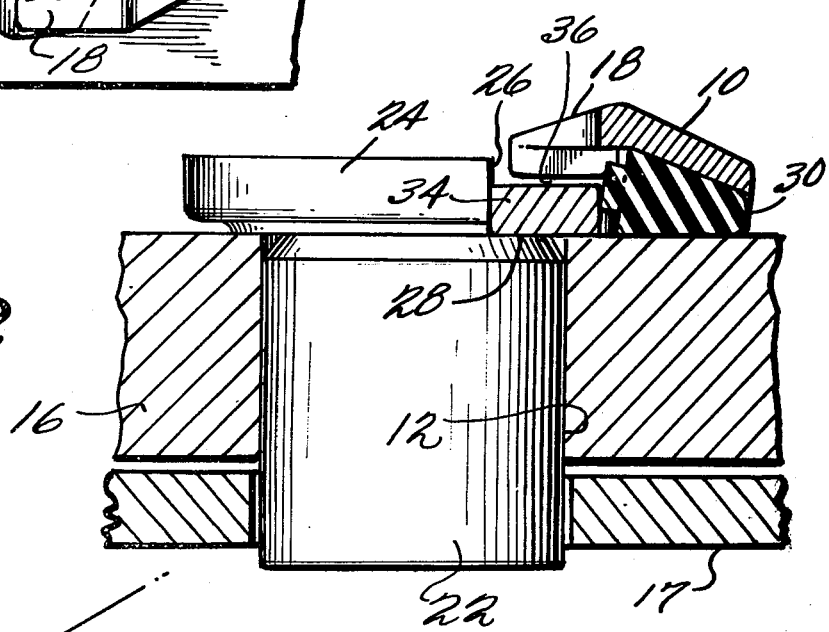
FIG. 2 is a view taken along lines 2—2 of FIG. 1.
Figure 3:
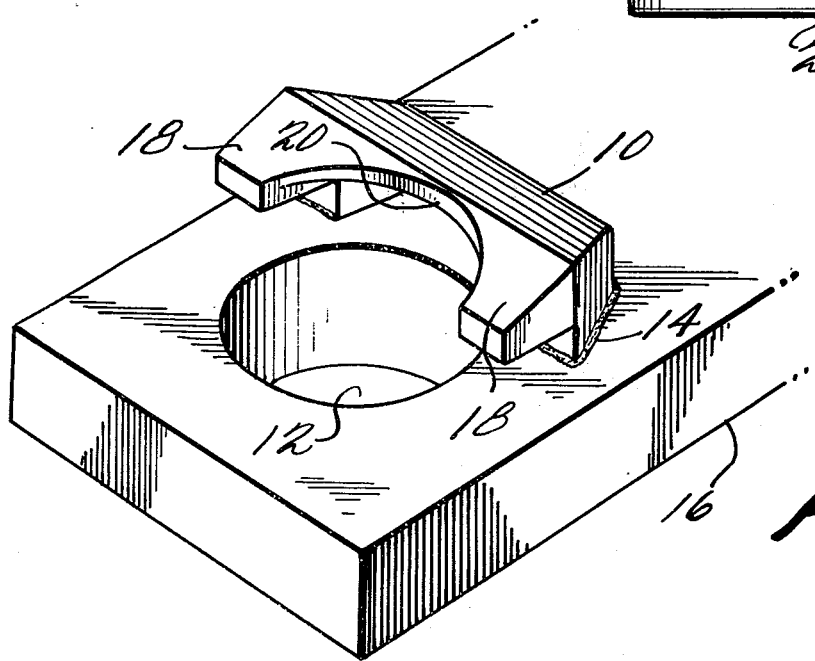
FIG. 3 is a perspective view of the retaining means shown in relationship to a bolt hole without a bolt inserted therein.

Referring to FIGS. 1–3 of the drawings, there is illustrated a first embodiment of a pin retention device embodying the principles of the present invention. A flange-like retaining element 10 is secured adjacent to a hole 12 in a supporting structure 16, as by means of a weld 14. The structure 16 may be a plate forming part of a pivotal or rigid connection to a second element 17. The retaining element 10 could also be integrally cast or otherwise connected with the plate 16. The retaining means 10 is provided with flanges 18 separated by an arcuate section 20 which is spaced a sufficient distance laterally from the hole 12 to enable the shank of the pin 22 to be inserted into or removed from the hole 12. The pin 22 has a head 24 which has been partially cut away or otherwise shaped so as to have a notch 26, one wall of which is formed by the head 24 and the other wall being formed by the end 28 of the shank of the pin. The presence of the notch 26 permits the pin 22 to be inserted into the hole 12 a distance such that the end 28 of the pin may be disposed adjacent and beneath the flanges 18.

With the pin 22 disposed in aperture 12 as shown in FIGS. 1 and 2, a plug 30 may be inserted into a space 32 provided in a rear portion of the retaining element 10. The plug 30 is constructed of rubber or other resilient material and is provided with protuberances 30a. When it is desired to secure the pin 22 within the aperture 12, a locking element such as a plate 34 having grooves 34a is forced by movement transverse to the axis of the pin to a position between the flanges 18 and the shank end 28 until grooves 34a are correspondingly engaged with protuberances 30a. With the drive plate 34 engaging the plug 30 and the end 28, the pin 22 may not be removed in either direction from the aperture 12.

With the pin 22 and the lock plate 34 assembled, there is a space 36 provided between the lock plate 34 and the flanges 18 which enables the pin 22 to move longitudinally within the aperture 12. Such movement between joints, while being slight, is important for compensating for joint tolerances. High stresses may result between the parts of pivot joints and other connections on earth moving equipment or other mechanically powered structures and provision for relative movement of bolts or pins within apertures is necessary.

Figure 4:
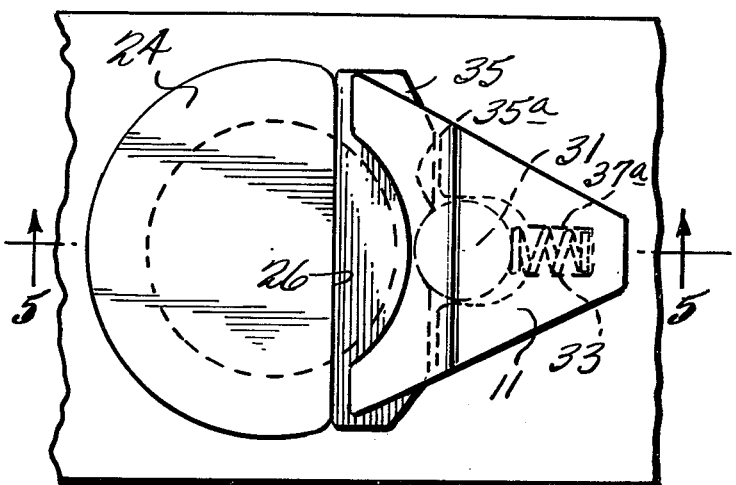
FIG. 4 is a top view of a second embodiment of the present invention and illustrates the relationship of a locking plate engaging a retaining plug and a bolt wherein the retaining plug is biased against the locking plate by means of a spring.
Figure 5:
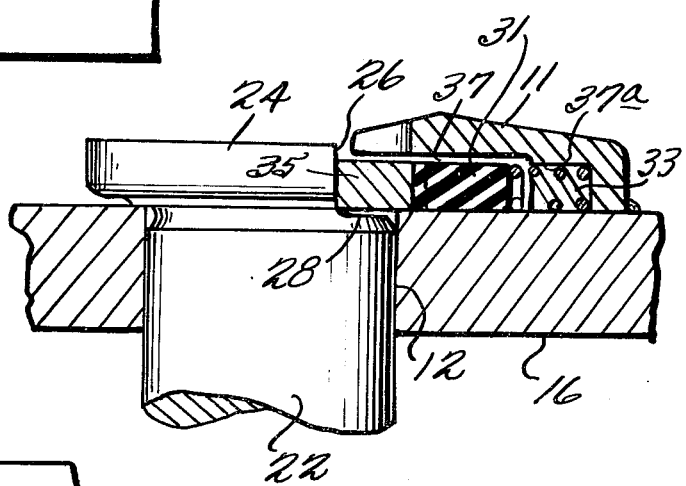
FIG. 5 is a view along lines 5—5 of FIG. 4.

With reference to FIGS. 4 and 5, there is disclosed a further embodiment of the present invention. The pin 22 inserted in an aperture 12 is provided with a head 24 having a notched portion 26 and an exposed end portion 28 similar to the pin structure shown in FIGS. 1 and 2. In the embodiment of FIGS. 4 and 5, a retaining element 11, similar to the retaining element 10 has a somewhat larger internal space 37 for accommodating a lock plate 35 and a retainer plug 31. A spring 33, such as a helical compression spring, is inserted into a recess 37a provided in the retaining element 11.

When it is desired to secure the pin 22 within the aperture 12 in accordance with the embodiment of FIGS. 4 and 5, the pin 22 is inserted into the aperture 12 and the plug 31 is placed against the spring 33. The lock plate 35, which provided with a groove 35a, is then driven or forced into the space 37 until the groove 35a comes into corresponding contact with the plug 31. The spring 33 displaces plug 31 against the lock plate 35 to ensure that the latter cannot be removed unless a significantly high force is applied to it to force the groove 35a to become disengaged from the plug 31. The plug 31 may be constructed of resilient material or of rubber.

Figure 6:
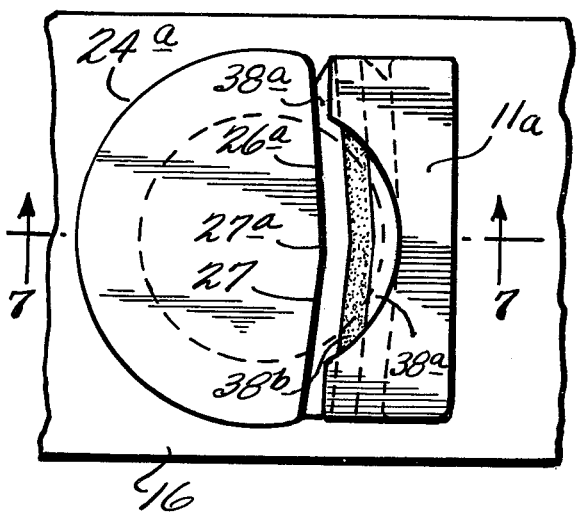
FIG. 6 is a top view of a third embodiment of the present invention and illustrates the use of a single drive lock pin engaging a notched bolt having a slight angle and also engaging a retaining means.
Figure 7:
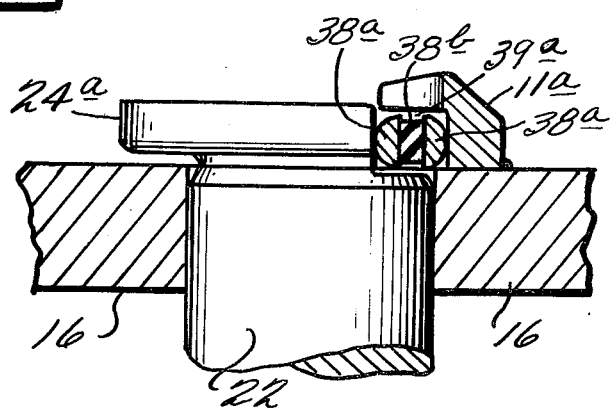
FIG. 7 is a side view taken along lines 7—7 of FIG. 6.

A third embodiment of pin retention device is illustrated in FIGS. 6 and 7. Here, the wall of the notch formed by the head 24a of the pin is angled so that wall portions 26a and 27 form a wedge having an apex at 27a. The retaining means 11a is provided with a space 39a for accommodating a locking element which in this embodiment may be constructed of rubber and soft steel. Soft steel portions 38a are located longitudinally adjacent to a longitudinal rubber portion 38b. Because of the wedge shape of the wall portions 26a and 27, when the lock pin 38a, 38b is inserted into the space 39a, a tight rigid fit results, and a high force is required to remove the lock pin.

It will be appreciated that the retention system of the present invention is simple and economical to construct inasmuch as it does not require close tolerances or the use of machined parts such as screws. The system is compactly located at only one end of the pin and prevents both axial removal of the pin from the hole and rotational movement of the pin within the hole. At the same time slight axial displacement of the pin during use is provided for.

The pin retention of the present invention may be advantageously used in many applications. Specifically, it is contemplated that the pin retention device be used as a securing means for pivotal joints and other connections in tractors, earth moving equipment and the like. For instance, in earth moving equipment such as a scraping machine, the pin retention device may be employed to secure the ends of a hydraulic cylinder between the frame of a scraping machine and a goose neck located on a driven cab. Other connections, such as between links and pins may of course employ the novel pin retention device of the present invention.

While the invention has been particularly shown and described with reference to the foregoing preferred embodiments thereof, it will be understood by those skilled in the art that other changes in form and detail may be made therein without departing from the spirit and scope of the invention as defined in the appended claims.

What is claimed is:

1. In a pinned joint: at least one pin having a shank and an enlarged head at one end, said pin being disposed in an aperture in a support element; a pin retention assembly including a flange-like retention member fixed to said support element adjacent the hole therein, said retention member having a flange portion spaced axially and laterally from one end of said hole so as to permit said pin to be inserted into said hole to a position in which a space is defined between said one end of said pin and the surface of the flange portion facing said support element, said head preventing further inserting movement of said pin, and a locking element releasably inserted into said space for engagement with said surface of said flange portion and with said one end of said pin so as to releasably lock said pin against withdrawal of said pin from said hole, said locking element residing in a notch in said pin, said notch having a first wall formed by said head and a second wall formed by the corresponding end of said shank, and means for applying transverse biasing forces to said locking element to frictionally engage the latter with said pin and with said retention member in order to hold said locking element in said space, said means including a plug of resilient material disposed in a pocket in said retention member and in engagement with said locking member.

2. In a pinned joint: at least one pin having a shank and an enlarged head at one end, said pin being disposed in an aperture in a support element; a pin retention assembly including a flange-like retention member fixed to said support element adjacent the hole therein, said retention member having a flange portion spaced axially and laterally from one end of said hole so as to permit said pin to be inserted into said hole to a position in which a space is defined between said one end of said pin and the surface of the flange portion facing said support element, said head preventing further inserting movement of said pin, and a locking element releasably inserted into said space for engagement with said surface of said flange portion and with said one end of said pin so as to releasably lock said pin against withdrawal of said pin from said hole, said locking element residing in a notch in said pin, said notch having a first wall formed by said head and a second wall formed by the corresponding end of said shank, and means for applying transverse biasing forces to said locking element to frictionally engage the latter with said pin and with said retention member in order to hold said locking element in said space, said means including a compression spring disposed in a pocket in said retention member.

3. In a pinned joint: at least one pin having a shank and an enlarged head at one end, said pin being disposed in an aperture in a support element; a pin retention assembly including a flange-like retention member fixed to said support element adjacent the hole therein, said retention member having a flange portion spaced axially and laterally from one end of said hole so as to permit said pin to be inserted into said hole to a position in which a space is defined between said one end of said pin and the surface of the flange portion facing said support element, said head preventing further inserting movement of said pin, and a longitudinally split pin assembly releasably inserted into said space for engagement with said surface of said flange portion and with said one end of said pin so as to releasably lock said pin against withdrawal from said hole, said split pin assembly residing in a notch in said pin, said notch having a first wall formed by said head and a second wall formed by the corresponding end of said shank, and means for applying transverse biasing forces to said split pin to frictionally engage the latter with said pin and with said retention member in order to hold said locking element in said space, said means including a resilient element disposed between the longitudinal parts of said split pin assembly so as to force one part against said pin and the other part against said retention member.

\* \* \* \* \*